United States Patent
Inagaki et al.

[11] Patent Number: 6,056,291
[45] Date of Patent: May 2, 2000

[54] METAL GASKET

[75] Inventors: Toshiyasu Inagaki; Yoshinori Morooka; Akihiro Kojima, all of Komaki, Japan

[73] Assignee: CKD Corporation, Japan

[21] Appl. No.: 09/084,002

[22] Filed: May 26, 1998

Related U.S. Application Data

[62] Division of application No. 08/764,879, Dec. 16, 1996, Pat. No. 5,797,604.

[30] Foreign Application Priority Data

Dec. 25, 1995 [JP] Japan .................................... 7-351467

[51] Int. Cl.[7] ...................................................... F16J 15/08
[52] U.S. Cl. .......................... 277/314; 277/618; 277/647
[58] Field of Search .................... 277/312, 314, 277/618, 647, 653, 652

[56] References Cited

U.S. PATENT DOCUMENTS

| | | | |
|---|---|---|---|
| 3,285,615 | 11/1966 | Trbovich | 277/206 R |
| 3,325,892 | 6/1967 | Delgodo | 277/205 |
| 3,820,799 | 6/1974 | Abbess et al. | 277/647 |
| 4,218,067 | 8/1980 | Halling | 277/647 |
| 4,452,462 | 6/1984 | Karr, Jr. | 277/206 R |
| 4,561,662 | 12/1985 | De Villepoix et al. | 277/205 |
| 4,602,888 | 7/1986 | Court et al. | 277/647 |
| 5,022,663 | 6/1991 | Fages et al. | 277/236 |
| 5,354,072 | 10/1994 | Nicholson | 277/206 R |

FOREIGN PATENT DOCUMENTS 2-13875  5/1990  Japan .

*Primary Examiner*—Chuck Y. Mah
*Assistant Examiner*—Vishal Patel
*Attorney, Agent, or Firm*—Finnegan, Henderson, Farabow, Garrett & Dunner, L.L.P.

[57] ABSTRACT

A metal gasket excellent in sealing performance and capable of sealing with a small pressing force. The metal gasket comprises at least one metal sheath with C-shaped cross-section and a ring elastic core surrounded by the metal sheath and the metal gasket is served for sealing with aid of the contact with the sealing face tightened by exerting a force in the axis center direction, wherein the metal sheath has the worked portion with a locally thin cross-section over the whole length, and when the metal sheath is exerted with a force and deformed, the deflection in the axis direction of the metal sheath due to concentrated stress on the thin worked portion causes to form projections at the both sides of the deflection which projections are pressed onto the sealing face.

8 Claims, 5 Drawing Sheets

METAL GASKET

This is a division of application Ser. No. 08/764,879, filed Dec. 16, 1996, now U.S. Pat. No. 5,797,604.

BACKGROUND OF THE INVENTION

1. Field of the Invention

This invention relates to a metal gasket for obtaining high air-tightness resulting from pressing on seal face of a sealing portion on which the metal gasket is placed.

2. Description of Related Art

In the manufacturing process of semiconductor, processes for thermodiffusing ultra-toxic gases such as silane, arsine, phosphine, and diborane on a silicon wafer base as impurity source have been employed and spontaneous-ignitable gases have been used.

Such gases used in the manufacturing process of semiconductor involves the risk of direct physical injury, for example, the lethal dose of arsine is 0.5 ppm and a little leakage of the gas causes physical injury, conventionally piping for such gas has been jointed by welding or sealing using a gasket for preventing leakage. Because such gases are usually toxic and also corrosive, a gasket consisting of rubber or resin can not be used and a metal gasket has been used for gasket sealing.

For equipments for manufacturing of semiconductors which involves handling of such hazardous gas, various metal gaskets has been proposed and used for high air-tightness. The conventional metal gasket will be described referring examples herein under.

FIG. 6 is a perspective view for illustrating the first conventional example of a metal gasket. The metal gasket 51 comprises a metal sheath with two layered structure having inside-sheath 53 and outside-sheath 54 with a cross-section in the form of C-shape provided adjacent each other in the axial direction and a metal core 52 comprising an elastic metal coil spring in the form of ring shape provided on the inside of the inside-sheath 53.

Otherwise, the second example of a conventional metal gasket disclosed in Japanese Unexamined Patent Publication No. Hei 2-138575 is shown in FIG. 7. The metal gasket 61 comprises a metal core 62 comprising a ring hollow elastic metal coil spring with an elliptic cross-section and an outside single-layered metal sheath 63 with a C-shaped cross-section surrounding the peripheral surface of the metal core 62 continuous in the axial direction.

When a gasket 61 having such a structure receives a compression force exceeding a prescribed value from the bracket 60 in the minor axis direction, the top and bottom sides deflect at the central portions to form arched surfaces 64 and 64 respectively as shown in FIG. 8, and two circles 65 and 66 between the arched surfaces 64 and 64 are served to seal the top and bottom faces. High sealing effect is exhibited by doubled sealing lines.

However, recently it is desirable to use austenite stainless steel, particularly SUS316 (referred to as merely SUS hereinafter), for it is excellent in corrosion resistance as sheath material of metal gaskets in stead of nickel for it can generate poison through reaction with a gas, however, SUS is disadvantageous in that the stability of sealing is poor.

The reason is described herein under. SUS316 has the hardness of as high as about Hv 320 in comparison with the hardness of nickel on the outside sheath surface of Hv 180. on the other hand, a flange on which the metal gasket is to be mounted has the hardness of about Hv 300 because the flange is formed of SUS316 or VIM-VAR material subjected to burnishing surface processing.

Accordingly, when a sheath consisting of nickel is used and there is hardness difference between a flange and the sheath, the sealing portion is strained on the sealing face of the bracket to make sure the air-tightness.

However, when there is no hardness difference between a flange and the sheath because high hardness material such as SUS is used for the sheath, the metal gasket is not strained to fit evenly on the sealing face, the stability of sealing is poor, and the poor sealing is a problem.

When there is hardness difference between a flange and the sheath because nickel is used for the sheath, the sheath is pressed on the sealing face with high pressure to cause strain, the material of the sheath is forced to penetrate into the sealing face of the flange to enhance the air-tightness.

However, when there is no hardness difference between the sheath of high hardness material such as SUS and a flange, because both the gasket of the first example with a circular cross-section and of the second example which forms double sealing lines with elliptic cross-section contact with a bracket on the curved surface to render increased contact surface area relatively and such contact between surfaces involves low areal pressure, the material of the sheath is not forced to penetrate to the sealing face not to enhance the air-tightness, it is disadvantageous in that the stability of sealing is poor.

Therefore, a very high pressing force is required to enhance the sealing stability.

It is the object of the present invention to provide a metal gasket excellent in sealing stability without such problem and capable of effectively preventing fluid from leakage with a reduced pressing force.

SUMMARY OF THE INVENTION

A metal gasket comprises at least one metal sheath with a C-shaped cross-section and a ring elastic core surrounded by the metal sheath, and is used for preventing leakage of fluid with aid of contact with the sealing face tightened by being exerted with a force in the axis center direction, wherein the metal sheath has a thin walled portion formed thin locally on the periphery of the metal sheath, and when a force is exerted to the metal sheath to deform, the deflection in the axis center direction caused by the stress concentration on the thin walled portion causes to form projections at the both sides of the deflection which projections are pressed onto the sealing face to prevent leakage of fluid.

The metal gasket of the present invention has the above-mentioned thin walled portions on both sides of the above-mentioned metal sheath in the above-mentioned metal gasket.

The metal gasket of the present invention has a flat thin walled portion of the above-mentioned metal sheath in the above-mentioned metal gasket.

The metal gasket of the present invention has a worked portion of the above-mentioned metal sheath with U-shaped, V-shaped, or ]-shaped cross-section in the above-mentioned metal gasket.

A metal gasket of the present invention having the above-mentioned structure functions as described herein under.

When the metal gasket is provided on the portion to be sealed and pressed by a force in the axis center direction, the stress concentration on the thin walled portion formed on the metal sheath causes the deflection and deformation of the thin walled portion. The deflection in the axis center direction of the metal sheath due to stress concentration causes to form projections at the both sides of the deflection which projections mark double sealing lines as the result of the contact. Because the edge of a projection is pressed onto the sealing face on each sealing line, the areal pressure at the tip of the edge is high and such high areal pressure is favorable for preventing leakage of fluid.

In other wards, the metal gasket forms double sealing lines, the tip of the sealing line contacts onto the sealing face with high contact pressure to provide the sealing stability.

The metal gasket of the present invention having the above-mentioned worked portion with a flat face worked to form a locally thin portion is pressed to form projections at the both sides of the deflection in the axis center direction at the middle portion of the locally flat thin portion, and the double sealing line which is in contact on the sealing face with a high contact pressure favors the sealing stability.

The flat face can be formed simply by cutting the end of the metal sheath, manufacturing cost is therefore low.

The metal gasket of the present invention has a metal sheath having the above-mentioned worked portion with a U-shaped, V-shaped, or ]-shaped groove cross-section worked to form a local thin portion, and the compression exerted to the metal gasket causes to form projections at the both sides of the deflection which is formed by deflecting in the axis center direction the thin portion at the recessed middle portion of the ]-shaped groove, or the bottom of U-shaped or V-shaped groove of the above-mentioned worked portion, thus the double sealing lines which are in contact with the sealing face with a high pressure favors the sealing stability.

DETAILED DESCRIPTION OF THE PREFERRED EMBODIMENTS

Figure 1:
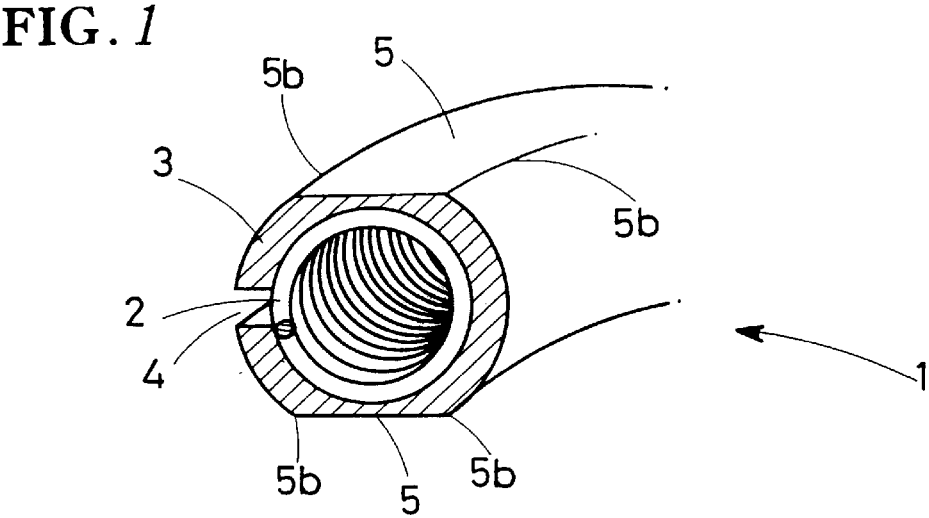
FIG. 1 is a perspective view for illustrating the first embodiment of a metal gasket in accordance with the present invention.

Next, embodiments of metal gaskets in accordance with the present invention will be described hereinafter referring to the drawings. FIG. 1 is a cross-sectional perspective view for illustrating a metal gasket 1 of the first embodiment. The metal gasket 1 comprises a sheath 3 which is continuous in the axial direction and has a C-shaped cross-section, and a ring elastic metal coil spring 2 which is surrounded by the sheath 3. The metal gasket 1 of this embodiment is featured by the sheath 3, that is, flat faces 5 and 5 are formed over the whole length of the metal gasket 1 at the top and bottom symmetrically with respect to the opening 4 of the sheath 3 with C-shaped cross-section. The sheath 3 is formed of SUS316 with a hardness of about 320 Hv.

Figure 2:
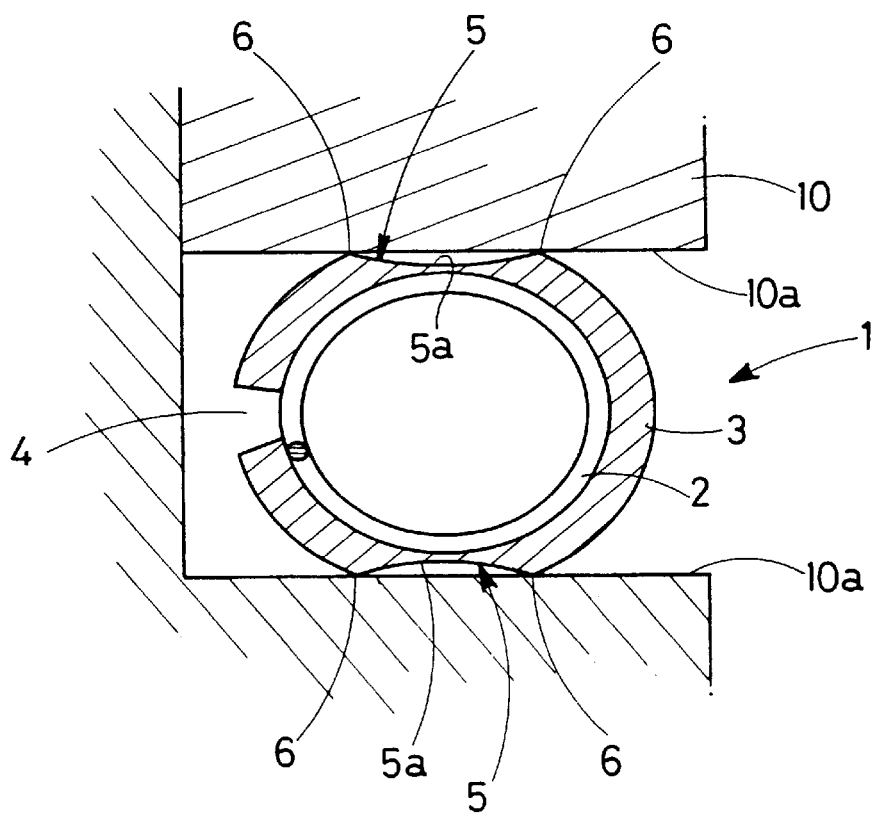
FIG. 2 is a cross-sectional view for illustrating a profile during sealing of the metal gasket of the first embodiment.

Such a metal gasket 1 is placed on a flange to be sealed and compressed, and the profile of the metal gasket under such condition is shown in FIG. 2. When the metal gasket 1 is placed on the sealing faces 10a and 10a of the flange 10, the flat faces 5 and 5 are brought into contact with the sealing faces 10a and 10a. When the flat faces 5 and 5 facing each other receive a compression force from the flange 10, the metal gasket 1 is deformed in the axis center direction.

When, because the sheath 3 exerted with a force from the flange 10 is structured so that the center portions 5 and 5 are formed thinnest and the portions farther from the center are formed thicker, the force is exerted onto the central portions 5a and 5a to cause local stress concentration. Thus, the sheath 3 is deflected and curved in the axis center direction namely the direction of the force at the central portions 5a and 5a as the result of the stress concentration, and the edges 5b and 5b of the flat faces 5 and 5 become projections 6 and 6 . . . between the central portions 5a and 5a. The projections 6 and 6 . . . are obtained along the whole length of the metal gasket 1 to render the double sealing of the sealing faces 10a and 10a of the flange.

Figure 3:
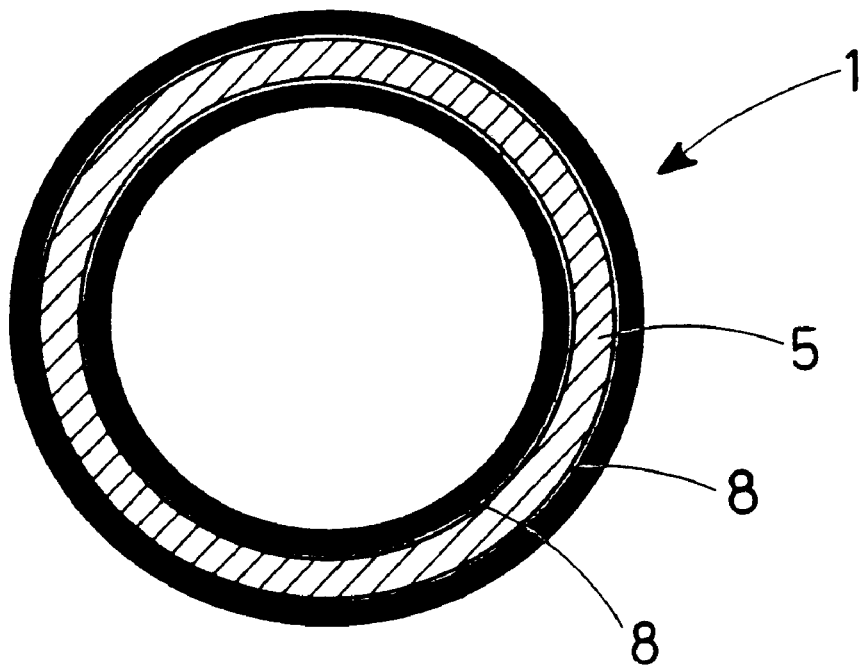
FIG. 3 is a plan view of a profile after sealing of the metal gasket of the first embodiment.
Figure 9:
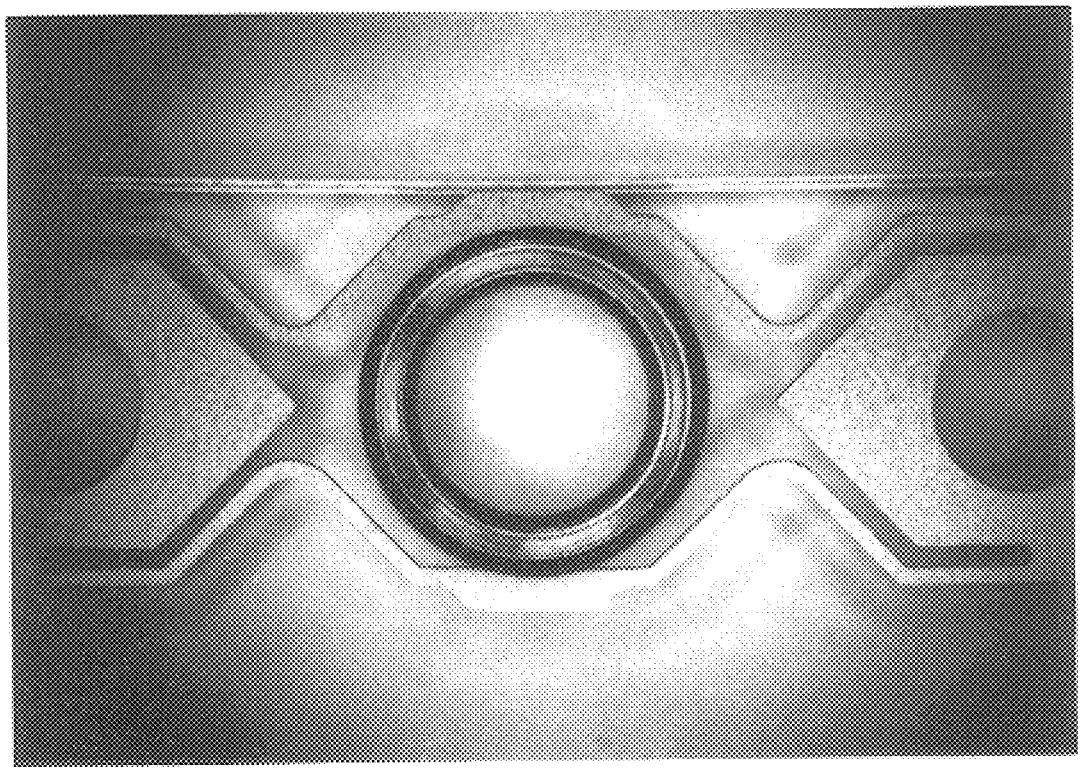
FIG. 9 is a photograph for illustrating a condition after sealing of the flat face of the metal gasket of the first embodiment in accordance with the present invention observed by a microscope.

By the way, the sealing face of the flange 10 at the portion where the projections 6 and 6 obtained by compression deformation had contacted is tested. A photograph of the flat face of the metal gasket after sealing is shown in FIG. 9. FIG. 3 is a plan view of the metal gasket 1 after sealing which is the schematic description of FIG. 9.

As shown in the photograph of FIG. 9 and in FIG. 3, the metal gasket 1 comprises a coil spring 2 surrounded by the sheath 3, and the flat portions 5 and 5 are formed by cutting the top and bottom portions for sealing. Such metal gasket is mounted on the flange 10 and taken out to observe, it is found clearly that there are circular outside and inside double sealing prints 8 and 8 at the positions corresponding to the edges formed on the flat face 5.

Accordingly, it is confirmed that the metal gasket 1 of the embodiment seals the sealing faces 10a and 10a with aid of the projections 6 and 6 . . . formed by compression because of the existence of worked flat faces 5 and 5.

The metal gasket 1 of the embodiment is applied to the case that the sealing face 10a and 10a of a flange are subjected to super roll processing to render smooth surface with reduced pit and to the case that the sealing face 10a and 10a of a flange are not subjected to super roll processing, and the test is repeated a plurality of times for testing the leakage of helium to the outside after 30 seconds from blowing of helium, the result shows no outside leakage for all tests. The hardness of the flanges 10 is all about 300 Hv and the detection sensitivity is 2.8×10–12 Pa m³/s or lower.

Accordingly, because the sharp projections 6, 6 . . . contact on the sealing faces 10a and 10a at the small area for sealing with aid of the projection 6, 6 . . . using the metal gasket 1 of the embodiment, the high pressing force is applied evenly on the contact areas, the face with not only smooth surface but also rough surface is sealed stably.

High air-tightness is obtained by sealing line of the projections 6, 6 . . . formed double.

Further, the metal gasket contacts on the sealing faces 10a and 10a only on the double sealing lines formed by the projections 6, 6 . . . with a small contact area, and because of the small contact area, high contact pressure can be obtained with a small tightening force to be exerted on the flange 10 which exerts a force to press the metal gasket.

On the other hand, the use of the flange 10 consists of a soft material with a hardness of 120 to 130 Hv causes to form a permanent sealing print on the sealing faces 10a and 10a. Repeated attaching and detaching of the metal gasket will happen to cause crossing of sealing prints. However, no leakage is resulted even after repeated use because of high pressure pressing with the projections 6, 6 . . . and double sealing lines.

Figure 4:
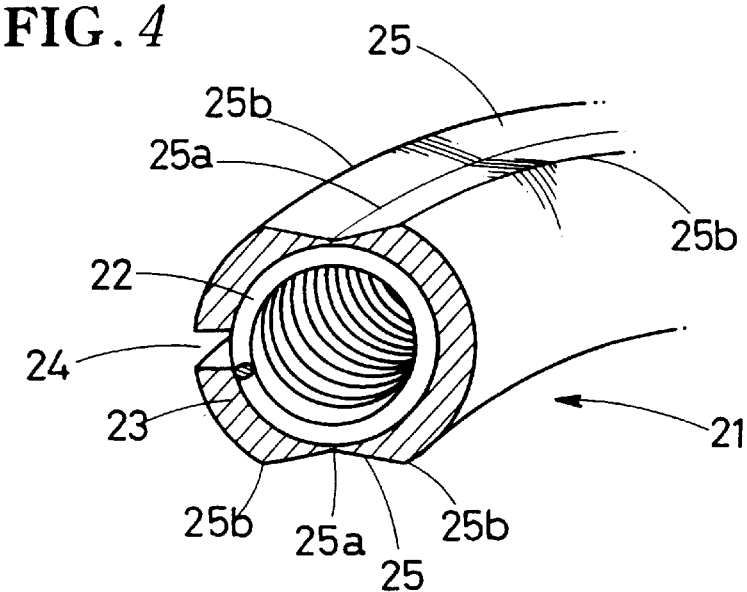
FIG. 4 is a cross-sectional perspective view for illustrating the second embodiment of a metal gasket in accordance with the present invention.

Next, the second embodiment of a metal gasket in accordance with the present invention will be described herein under. FIG. 4 is a cross-sectional perspective view for illustrating a metal gasket 21 of the second embodiment. Likewise the configuration of the first embodiment, this gasket 21 also comprises a sheath 23 with a C-shaped cross-section and a coil spring 22 which is surrounded by the sheath 23. The sheath 23 features the metal gasket 21 of this embodiment, V-shaped grooves 25 and 25 are formed over the whole length of the metal gasket 21 at the top and bottom symmetrically with respect to the opening 24 of the sheath 23 with C-shaped cross-section.

Figure 5:
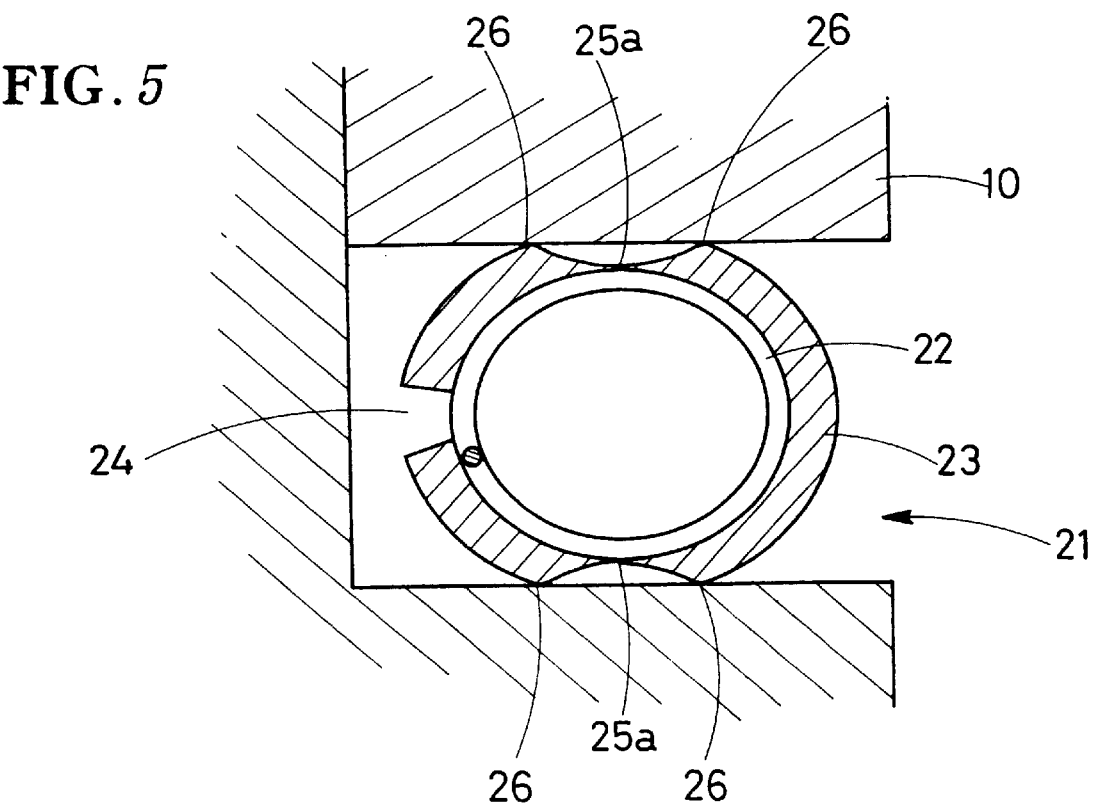
FIG. 5 is a cross-sectional view for illustrating a profile during sealing of a metal gasket of the second embodiment.
Figure 6:
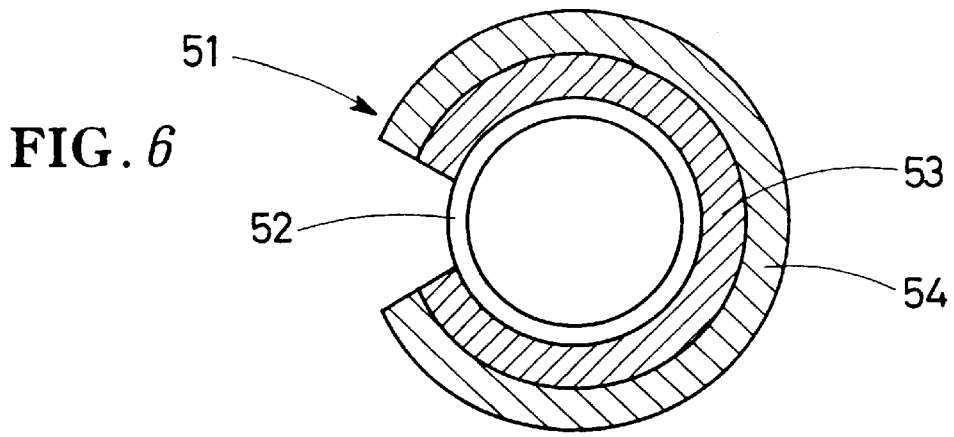
FIG. 6 is a cross-sectional view for illustrating the first example of the conventional metal gasket.
Figure 7:
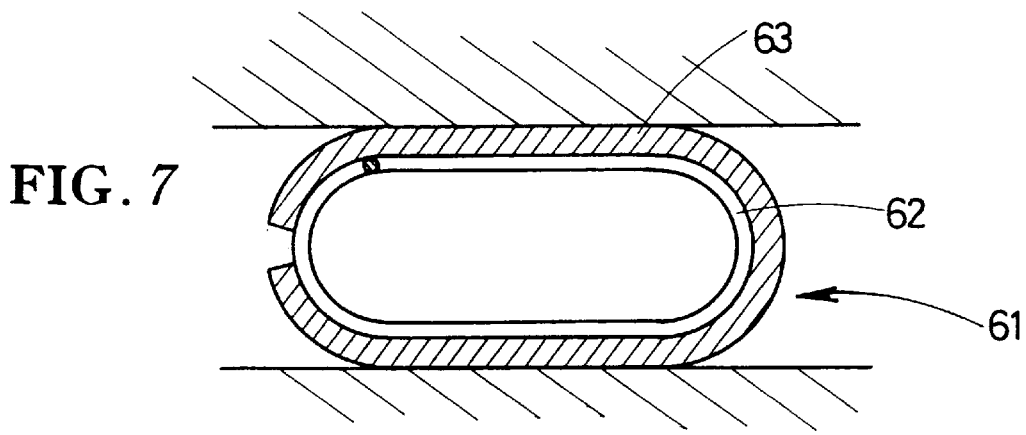
FIG. 7 is a cross-sectional view for illustrating the second example of the conventional metal gasket.
Figure 8:
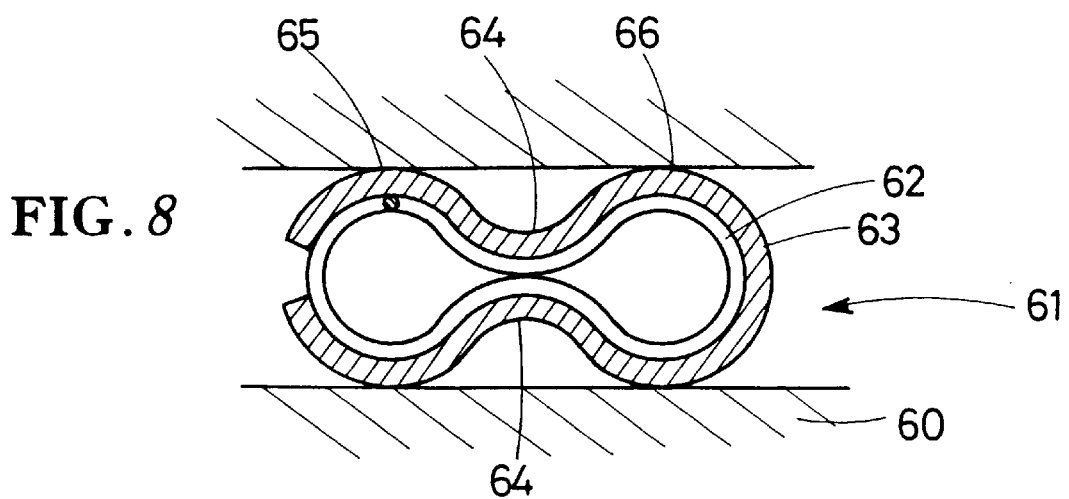
FIG. 8 is a cross-sectional view for illustrating a profile during sealing of the metal gasket of the second example.

When a metal gasket 21 on which such V-shaped grooves 25 and 25 are formed is mounted on a flange 10, projections 26 and 26 . . . is formed as shown in FIG. 5 to ensure the sealing.

In detail, when a metal gasket 21 is provided on a flange 10 and a compression force is exerted from the flange 10 to the top and bottom V-shaped grooves, the metal gasket 21 is deformed to the axis center direction. When, because the V-shaped groove 25 and 25 which is directly exerted with the force is thinnest at the central portions 25a and 25a, the places are subjected to stress concentration.

Accordingly, as shown in FIG. 5, the central portions 25a and 25a which is subjected to the stress concentration of the sheath 23 are deflected and curved in the axis center direction. Thus, the edges 25b and 25b . . . of the V-shaped grooves 25 and 25 are projected to form projections 26, 26 . . . between the central portions 25a and 25a. The sharp projections 26, 26 . . . ensure the double sealing on the sealing faces 10a and 10a of the flange 10.

In the metal gasket 21 of the embodiment, the forming of worked V-shaped grooves 25 and 25 allows the projections 26 and 26 to be sharper than those in the first embodiment, and the stability is enhanced more. In other words, the tightening of the metal gasket 21 with smaller pressing force is sufficient for sealing.

The metal gasket of the invention is not limited to the embodiments described hereinbefore, various modifications may be applied within the scope of the present invention.

For example, in the embodiments described hereinbefore, only flat face and V-shaped groove are shown as the configuration of the worked portion formed on the sheath, however, the worked portion may be a worked portion with ]-shaped, U-shaped cross-section, or other shaped cross-section as described in the claims as far as the shape forms a thin portion for favoring the projection when compressed.

Further, for example, the metal gasket comprising one layered sheath is shown in the embodiments described hereinbefore, however, the sheath may comprises a two layered sheath as shown in the first embodiment or a sheath with more layers.

This invention provides a metal gasket, even with high hardness, excellent in sealing stability and capable of sealing with small pressing force because of the structure that the worked portion to provide local thinned portions on a metal sheath over the whole length, and the deflection to the axis direction of the sheath due to concentrated stress on the thin worked portion when the metal sheath is exerted with a force and deformed causes projections at the both sides of the deflection which projections are pressed onto the sealing face.

What is claimed is:

1. A process for preventing leakage of fluid by use of a metal gasket having at least one metal sheath with a C-shaped cross-section comprising:

providing on the periphery of the at least one metal sheath a thin-walled portion;

positioning the metal gasket adjacent to a sealing face with the thin-walled portion facing the sealing face, applying a force to the metal-gasket via the sealing face, causing in response to the applied force a deflection in the thin-walled portion and a formation of projections at both sides of the deflection, and pressing the projections onto said sealing face to prevent leakage of fluid.

2. The process as claimed in claim 1, further comprising:

providing on the periphery of the at least one metal sheath a second thin-walled portion positioned across from the thin-walled portion, and during the positioning step, positioning the second thin-walled portion adjacent and facing a second sealing face, causing in response to the applied force a second deflection in the second thin-walled portion and a formation of second projections at both sides of the second deflection, pressing the second projections into said second sealing face.

3. The process as claimed in claim 1, wherein said thin-walled portion of said at least one metal sheath is provided with a V-shaped cross-section.

4. The process as claimed in claim 1, wherein the thin-walled portion is thinner at the center thereof.

5. A process for providing sealed contact between a metal sheath of an annular metal gasket and at least one opposing surface, comprising:

providing on the periphery of the metal sheath a thin-walled surface with edges, placing the metal gasket adjacent the at least one opposing surface with the thin-walled surface facing the at least one opposing surface, exerting a force upon the metal gasket, causing the metal sheath to deform and the thin-walled surface to deflect inwardly in response to the exerted force, and forming projections at the edges which press into the at least one opposing surface to prevent leakage of fluid.

6. The process as claimed in claim 5, further comprising:

providing on the periphery of the metal sheath a second thin-walled surface with edges, said second thin-walled surface positioned across from the thin-walled surface, and during the placing step, placing the second thin-walled surface adjacent and facing a second opposing surface, causing the second thin-walled surface to deflect inwardly in response to the exerted force, and during the forming step, forming second projections at the edges of the second thin-walled surface which press into the second opposing surface.

7. The process as claimed in claim 5, wherein said thin-walled surface of said metal sheath is provided with a V-shaped cross-section.

8. The process as claimed in claim 5, wherein the thin-walled surface is thinner at the center thereof.

* * * * *